US007242550B2

United States Patent
Hara et al.

(10) Patent No.: US 7,242,550 B2
(45) Date of Patent: Jul. 10, 2007

(54) MAGNETIC DISK APPARATUS SUPPRESSING ADJACENT TRACK INFLUENCE

(75) Inventors: Takeshi Hara, Kawasaki (JP); Mitsuo Kamimura, Kawasaki (JP); Fumiya Kudo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/352,048

(22) Filed: Feb. 10, 2006

(65) Prior Publication Data

US 2007/0070869 A1 Mar. 29, 2007

(30) Foreign Application Priority Data

Sep. 26, 2005 (JP) ............................. 2005-277837

(51) Int. Cl.
G11B 5/596 (2006.01)
G11B 5/09 (2006.01)
(52) U.S. Cl. ..................... 360/77.02; 360/48
(58) Field of Classification Search ............... None
See application file for complete search history.

(56) References Cited

U.S. PATENT DOCUMENTS 5,293,565 A * 3/1994 Jaquette et al. .......... 369/275.3
6,819,519 B2 * 11/2004 Takaishi et al. .......... 360/77.02
6,950,256 B2  9/2005 Kadokawa
2005/0052767 A1 3/2005 Miyata et al.

FOREIGN PATENT DOCUMENTS

| JP | 62-065271 | 3/1987 |
| JP | 3-073406 | 3/1991 |
| JP | 2002-237142 | 8/2002 |
| JP | 2003-016745 | 1/2003 |
| JP | 2005-100611 | 4/2005 |

* cited by examiner

*Primary Examiner*—K. Wong
(74) *Attorney, Agent, or Firm*—Greer, Burns & Crain, Ltd.

(57) ABSTRACT

A magnetic disk apparatus is configured such that a physical track number is converted into an absolute track number by making a track pitch in an absolute track area formed by a given magnetic head wider by a given amount than a track pitch in a corresponding absolute track area formed by a reference magnetic head if the number of absolute tracks is larger in the absolute track area formed by the given magnetic head than in, the absolute track area formed by the reference magnetic head although the number of physical tracks is identical in corresponding physical track areas between different magnetic disks. The given amount is commensurate with an unused area corresponding to a difference in the number of absolute tracks between the absolute track area formed by the given magnetic head and the absolute track area formed by the reference magnetic head.

12 Claims, 10 Drawing Sheets

FIG.15

| ZONE NUMBER | USER AREA BOUNDARY | TPI INFORMATION | | RELAXATION RATE | ABSOLUTE AREA BOUNDARY |
|---|---|---|---|---|---|
| 0 | A | α1 | β1 | γ1 | a |
| 1 | C | α2 | β2 | γ2 | c |

Hd0

| ZONE NUMBER | PHYSICAL AREA BOUNDARY |
|---|---|
| 0 | a' |
| 1 | c' |

COMMON TO EACH HEAD

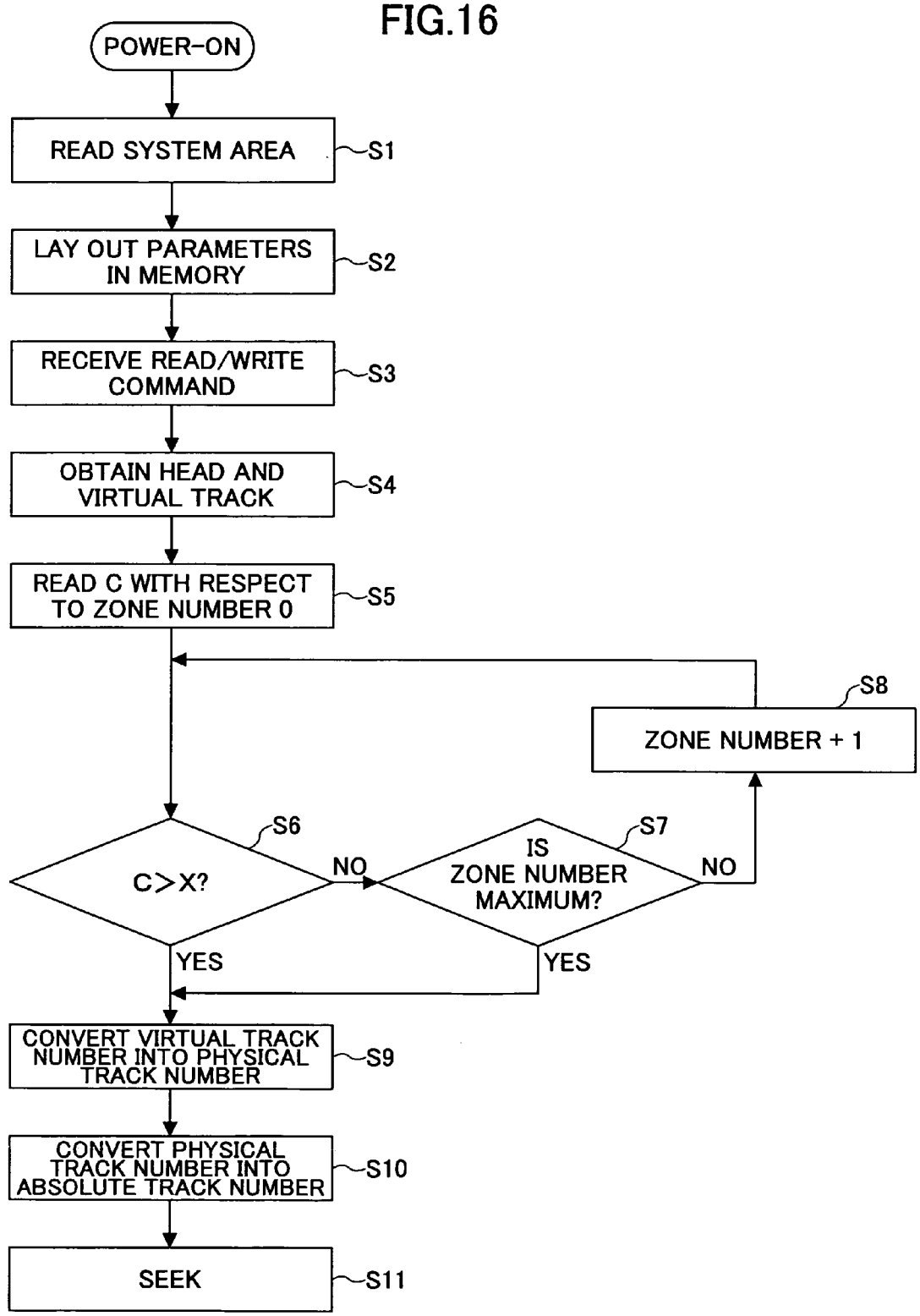

MAGNETIC DISK APPARATUS SUPPRESSING ADJACENT TRACK INFLUENCE

BACKGROUND OF THE INVENTION

1. Field of the Invention

The present invention generally relates to magnetic disk drives, and particularly relates to a magnetic disk drive provided with a magnetic disk on which servo information is written by a stack servo track writer (SSTW) in a radial pattern in radial directions to be placed at equal intervals in the circumferential direction.

2. Description of the Related Art

An SSTW (also referred to as STW) is an apparatus designed to write servo information on a magnetic disk. Each magnetic disk on which servo information is written by an SSTW is mounted in an individual magnetic disk drive. Magnetic disks having servo information written by an SSTW in advance are mounted in magnetic disk drives, so that the productivity of the magnetic disk drives can be improved compared to the case in which servo information is written to individual magnetic disks after these disks are mounted in magnetic disk drives.

The eccentricity of a magnetic disk set in an SSTW differs from the eccentricity of the magnetic disk having servo information written thereon by the SSTW as mounted in a magnetic disk drive. Further, the tilt of the surface of a magnetic disk set in an SSTW differs from the tilt of the magnetic disk having servo information written thereon by the SSTW as mounted in a magnetic disk drive. Moreover, when a magnetic head serving as a reference in an SSTW is fixedly placed at a given position on a magnetic disk, this position does not match the corresponding position of another magnetic head on another magnetic disk. A similar phenomenon also occurs when this magnetic disk having servo information written thereon by the SSTW is mounted in a magnetic disk drive. Because of these factors, the tracks of a magnetic disk having servo information written thereon as set in an SSTW may not match and deviate from tracks (scan paths) scanned by a magnetic head on this magnetic disk having the servo information written by the SSTW as mounted in a magnetic disk drive. When a magnetic head serving as a reference in a magnetic disk drive is fixedly placed at a given position on a magnetic disk, this position does not match the corresponding position of another magnetic head on another magnetic disk, resulting in a difference in accessed track numbers. In this application, such phenomenon is referred to as an "inter-media collapse".

Patent Document 1 discloses a method of making a track pitch vary in response to the density of the magnetic flux of the magnetic field of a voice coil motor when servo information is written to a magnetic disk. Patent Document 2 discloses a method of mounting a magnetic disk having control information written thereon by an SSTW in a magnetic disk drive. Patent Document 3 discloses a method of making a track pitch vary in response to a radial position in order to compensate for the phenomenon in which the skew angle of a magnetic head to a magnetic disk differs depending on the radial direction. Patent Document 4 discloses a method of changing a track pitch separately for each area on a magnetic disk in order to provide a sufficiently large track pitch compared to the track width in which data is written. Patent Document 5 discloses a method of writing servo information to a magnetic disk at accurate track pitches.

[Patent Document 1] Japanese Patent Application Publication No. 62-65271

[Patent Document 2] Japanese Patent Application Publication No. 3-73406

[Patent Document 3] Japanese Patent Application Publication No. 2002-237142

[Patent Document 4] Japanese Patent Application Publication No. 2003-16745

[Patent Document 5] Japanese Patent Application Publication No. 2005-100611

As the record density of a magnetic disk increases, the track pitch decreases, resulting in an adjacent track influence (hereinafter referred to as an ATI) becoming unignorable. That is, when data is written to tracks on both sides of a given track, for example, these tracks serve as a noise source with respect to the given track, which causes an error rate to increase when data is read from this given track. As the number of times data is written to the tracks on both sides increases, the deterioration of the error rate becomes increasingly conspicuous. In the worst case, data cannot be properly read from this given track.

Patent Document 3 as described above changes a track pitch separately for each area on a magnetic disk as an anti-ATI measure. Since the track pitch is constant within each area, however, it is difficult to achieve the objective of improving the record density of a magnetic disk simultaneously with the objective of suppressing an ATI.

Accordingly, there is a need for a magnetic disk drive that can improve the record density of a magnetic disk and suppress an ATI at the same time. That is, there is a need for a magnetic disk drive that can suppress the occurrence of an ATI accompanying the improvement of the record density of a magnetic disk.

SUMMARY OF THE INVENTION

It is a general object of the present invention to provide a magnetic disk apparatus that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by magnetic disk apparatus particularly pointed out in the specification in such full, clear, concise, and exact terms as to enable a person having ordinary skill in the art to practice the invention.

To achieve these and other advantages in accordance with the purpose of the invention, the invention provides a magnetic disk apparatus for reading read data from and writing write data to magnetic disks on a virtual-track-number-specific basis, absolute track numbers being track numbers of tracks formed on the magnetic disks by an SSTW, physical track numbers being track numbers into which the absolute track numbers are converted such that when a reference magnetic head is fixedly placed at any given position on the magnetic disks, identical track numbers are read from the reference magnetic head and from another magnetic head, and virtual track numbers being track numbers into which the physical track numbers are converted such that a track pitch becomes suitable for each magnetic head and also for each area on the magnetic disks. The magnetic disk apparatus includes a first conversion unit configured to convert a physical track number into an absolute track number by making a track pitch in an absolute track area formed by said another magnetic head wider by a given amount than a track pitch in a corresponding absolute track area formed by the reference magnetic head if a number of absolute tracks is larger in the absolute track area of absolute tracks formed by said another magnetic head than in the absolute track area of absolute tracks formed by the reference magnetic head although a number of physical tracks is identical in corresponding physical track areas between different magnetic disks, the given amount being commensurate with an unused area corresponding to a difference in the number of absolute tracks between the absolute track area of absolute tracks formed by said another magnetic head and the corresponding absolute track area of absolute tracks formed by the reference magnetic head.

According to another aspect of the present invention, a magnetic disk apparatus reads read data from and writes write data to magnetic disks on a virtual-track-number-specific basis, absolute track numbers being track numbers of tracks formed on the magnetic disks by an SSTW, physical track numbers being track numbers into which the absolute track numbers are converted such that when a reference magnetic head is fixedly placed at any given position on the magnetic disks, identical track numbers are read from the reference magnetic head and from another magnetic head, and virtual track numbers being track numbers into which the physical track numbers are converted such that a track pitch becomes suitable for each magnetic head and also for each area on the magnetic disks. The magnetic disk apparatus includes a first conversion unit configured to convert a virtual track number into a physical track number, wherein the first conversion unit is configured to change a track pitch of virtual tracks continuously for each area on the magnetic disks.

According to at least one embodiment of the present invention, a magnetic disk drive can suppress the occurrence of an ATI accompanying the improvement of the record density of magnetic disks.

BRIEF DESCRIPTION OF THE DRAWINGS

Other objects and further features of the present invention will be apparent from the following detailed description when read in conjunction with the accompanying drawings, in which:

FIG. 15 is a drawing for explaining parameters stored in memory when control such as the one described in connection with the first embodiment is concurrently used; and FIG. 16 is a flowchart showing a seek operation of a magnetic disk drive having a parameter table stored therein.

DESCRIPTION OF THE PREFERRED EMBODIMENTS

In a magnetic disk drive in which magnetic disks having servo information written by an SSTW are mounted, when a magnetic head serving as a reference is fixedly placed at a given position on a magnetic disk, this position and the corresponding position of another magnetic head on another magnetic disk have the same physical track number, but may have different absolute track numbers. The offset of an absolute track number differs from magnetic head to magnetic head. Because of this, the numbers of absolute tracks in the corresponding absolute track areas may differ between two magnetic disks despite the fact that the numbers of physical tracks in the corresponding physical track areas are the same. If an absolute track area of absolute tracks formed by a reference magnetic head has a smaller number of absolute tracks than does an absolute track area of absolute tracks formed by another magnetic head, the absolute track area of absolute tracks formed by such another magnetic head ends up having an unused area commensurate with the difference in the numbers of absolute tracks.

In the present invention, the track pitch is changed in response to the number of absolute tracks in an absolute track area to suppress the generation of an unused area, thereby improving the suppression of an ATI compared to a conventional magnetic disk drive in which magnetic disks having the corresponding record density are mounted. If the number of absolute tracks is smaller in an absolute track area formed by a reference magnetic head than in an absolute track area formed by another magnetic head, the absolute track area formed by such another magnetic head ends up having an unused area commensurate with the difference in the numbers of absolute tracks, without any countermeasure. In consideration of this, the track pitch in the absolute track area formed by such another magnetic head is widened by the amount corresponding to (commensurate with) the size of this unused area, compared with the track pitch in the absolute track area formed by the reference magnetic head. With this provision, it is possible to relax the condition of the track pitch of the absolute tracks formed by such another magnetic head, thereby improving the suppression of an ATI by a commensurate amount.

In the following, embodiments of the magnetic disk drive according to the present invention will be described with reference to the accompanying drawings.

Figure 1:
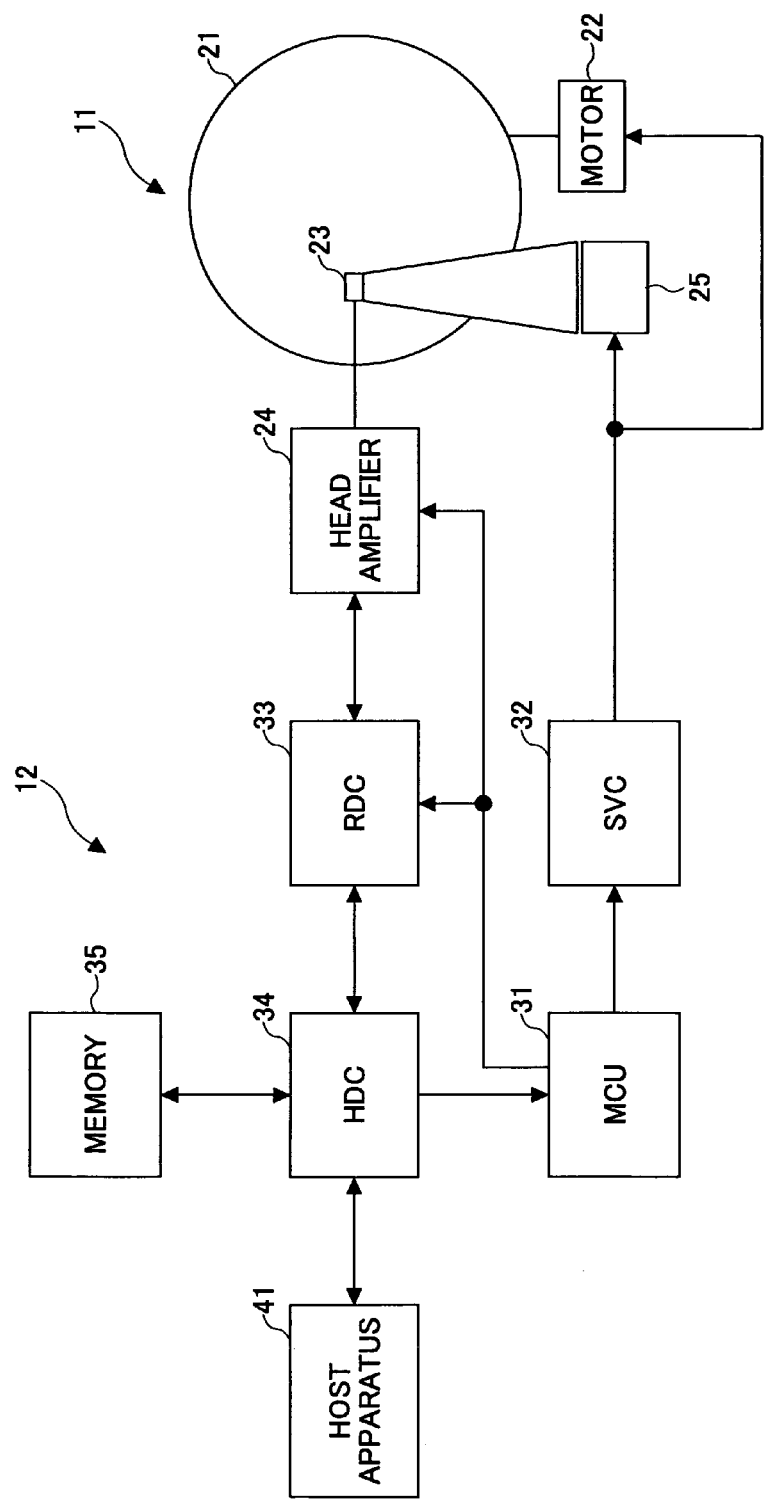
FIG. 1 is a block diagram showing the configuration of main parts of a first embodiment of the magnetic disk drive according to the present invention.

FIG. 1 is a block diagram showing the configuration of main parts of a first embodiment of the magnetic disk drive according to the present invention. For the sake of convenience of explanation, a magnetic disk drive 1 shown in FIG. 1 is assumed to be such a model type that N heads (N is an integer greater than or equal to 2) can be mounted at the maximum. The magnetic disk drive 1 includes a disk enclosure 11 and a printed circuit board 12.

The disk enclosure 11 includes one or more magnetic disks 21, a motor 22 for rotating the magnetic disks 21, a plurality of magnetic heads 23 provided in one-to-one correspondence to the magnetic disks 21, a head amplifier 24, and an actuator 25 for moving the magnetic heads 23.

The printed circuit board 12 includes an MCU (micro computer unit) 31, a servo controller (SVC) 32, a read channel (RDC) 33, a hard-disk controller (HDC) 34, and a data buffer memory 35 serving as a memory unit (or memory means). The data buffer memory 35 is implemented by use of a RAM or the like. The memory unit (or memory means) includes a nonvolatile memory (not shown) that is implemented as a ROM or the like storing firmware or the like.

The printed circuit board 12 is connected to a host apparatus 41 such that data and instructions can be transmitted and received.

The basic configuration of the magnetic disk drive 1 shown in FIG. 1 is well-known, and a description thereof will be omitted. The MCU 31 controls the entirety of the magnetic disk drive 1 inclusive of the RDC 33 and the like. The MCU 31 receives positional information indicative of the positions of the magnetic heads 23 on the magnetic disks 21 from the RDC 33, and also receives address information of the data buffer memory 35 from the HDC 34. The SVC 32 controls the motor 22 and the actuator 25 under the control of the MCU 31. The RDC 33 includes a read process system for processing read signals obtained via the head amplifier 24 as these signals are read by the magnetic heads 23 from the magnetic disks 21, and also includes a write process system for processing write signals to be written to the magnetic disks 21 by the magnetic heads 23 through the head amplifier 24. The HDC 34 controls the exchange of read data and write data between the host apparatus 41 and the magnetic disk drive 1 based on instruction from the host apparatus 41. Further, the HDC 34 also performs a cache operation that temporarily stores the read data and write data in the data buffer memory 35.

In the following, the absolute track (or cylinder) number, the physical track (or cylinder) number, and the virtual track (or cylinder) number will be described.

Absolute tracks are the tracks that are actually formed on the magnetic disks 21 by an SSTW, and the absolute track number indicates a track number with respect to these tracks. In the magnetic disk drive 1 having the magnetic disks 21 mounted therein, the absolute track numbers read by the magnetic heads 23 while the actuator 25 having the magnetic heads 23 mounted thereon is in the state of being fixed may not match each other due to an inter-media collapse as previously described.

The physical track number is the track number into which an absolute track number read by each of the magnetic heads 23 is converted, such that when one of the magnetic heads 23 serving as a reference (hereinafter referred to as a reference magnetic head) is fixedly placed at any given position on the magnetic disks 21, the same track number is read from the reference magnetic head 23 and from another magnetic head 23 despite the presence of the inter-media collapse. When the reference magnetic head 23 is fixedly placed at a position corresponding to physical track number 3000 on the magnetic disk 21, the absolute track number read by the reference magnetic head 23 may be 3200, and the absolute track number read by another magnetic head 23 may be 2900. In such a case, the conversion amount (i.e., an offset) by which physical track number 3000 is converted into an absolute track number is +200 for the reference magnetic head 23 and −100 for such another magnetic head 23.

The virtual track number is the track number into which the physical track number is converted, such that a track pitch becomes suitable for each one of the magnetic heads 23 and also for each area on the magnetic disks 21. Tracks in which user data is recorded are managed by use of the virtual track number, so that the virtual track is sometimes referred to as a user track. Access to the magnetic disk drive 1 based on instruction from the host apparatus 41, i.e., the reading of read data from the magnetic disks 21 and the writing of write data to the magnetic disks 21, is performed on a virtual-track-number-specific basis (in units of virtual track numbers or in increments of virtual track numbers).

Conversion from the physical track number or the virtual track number into the absolute track number involves computation using a decimal point. This embodiment has a feature in the conversion from the physical track number to the absolute track number.

Figure 2:
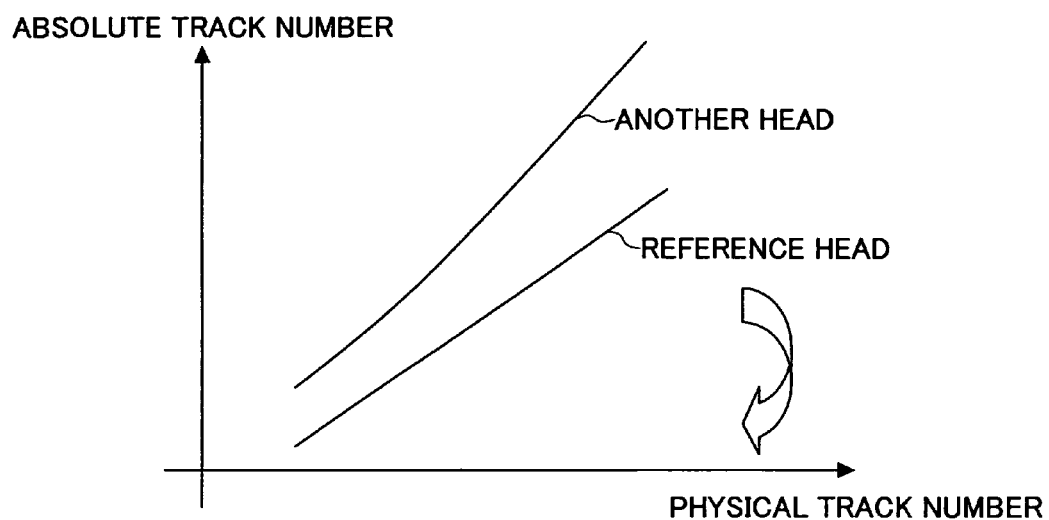
FIG. 2 is a drawing showing the relationship between the absolute track number and the physical track number with respect to a reference magnetic head and another magnetic head.

FIG. 2 is a drawing showing the relationship between the absolute track number and the physical track number with respect to the reference magnetic head 23 and another magnetic head 23. For the sake of convenience of explanation, in FIG. 2, the vertical axis represents the absolute track number that increases towards the outer circumference of the magnetic disks 21 in a radial direction, and the horizontal axis represents the physical track number, with these numbers represented in arbitrary units.

Figure 3:
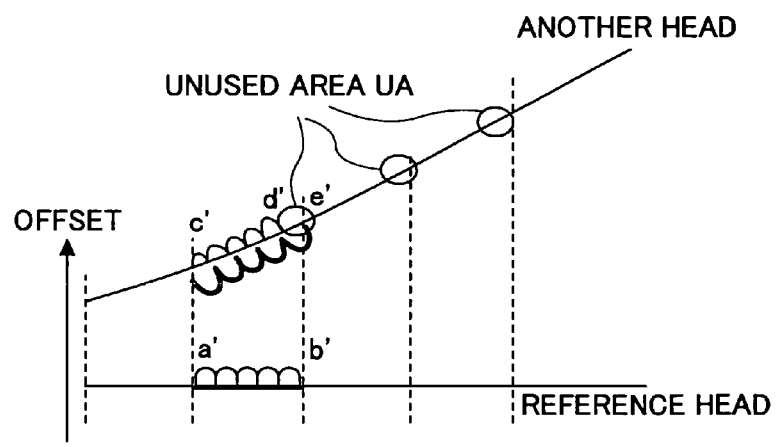
FIG. 3 is a drawing showing the offset of an absolute track formed by a magnetic head relative to an absolute track formed by the reference magnetic head.

FIG. 3 is a drawing showing the offset of an absolute track formed by a magnetic head 23 relative to an absolute track formed by the reference magnetic head 23. In FIG. 3, the virtual axis represents the offset, and the horizontal axis represents the radial position on the magnetic disks 21, with each axis represented in an arbitrary unit. In FIG. 3, the right-hand side corresponds to the inner circumference of the magnetic disks 21, and each of the sections separated by dotted lines corresponds to a physical track area provided on the magnetic disks 21. A physical track area may be a zone on the magnetic disks 21.

In FIG. 3, if the track pith (TPI: track per inch) of absolute tracks is the same between the reference magnetic head 23 and another magnetic head 23, the number of absolute tracks in the section from a' to b' formed by the reference magnetic head 23 is the same as the number of absolute tracks in the portion from c' to d' of the corresponding section from c' to e' formed by another magnetic head 23. This results in the area from d' to e' being an unused area. In the present embodiment, this unused area is utilized. To be specific, the number of absolute tracks in the section from a' to b' and the number of absolute tracks in the area from c' to d' are kept the same, and the TPI of absolute tracks is changed such that the TPI of absolute tracks in the area from c' to d' becomes wider than the TPI of absolute tracks in the section from a' to b'. This can relax the condition of the TPI of absolute tracks formed by such another magnetic head 23, thereby improving the suppression of an ATI by a corresponding amount with respect to the absolute tracks formed by such another magnetic head 23. Further, since the condition of the TPI of absolute tracks formed by such another magnetic head 23 is relaxed, a difference in seek distance between the magnetic heads 23 can be reduced when a seek operation toward any given physical track number (physical cylinder number) is performed. This serves to suppress the generation of the wait time to wait for the rotation of the magnetic disks 21 at the time of sequential access or the like.

In actuality, there is an offset of absolute tracks formed by the reference magnetic head 23 due to an inter-media collapse as previously described. Because of this, conversion from a physical track number x' into an absolute track number x with respect to the reference magnetic head 23 can be performed according to x=x'+o1 where o1 represents an offset amount. Conversion from a physical track number x' into an absolute track number x with respect to another magnetic head 23 can be performed according to x=γx'+o2. Here, γ represents a rate of relaxation of the track pitch. In the example shown in FIG. 3, γ is equal to (Tn2+UA)/Tn1 where Tn1 is the number of absolute tracks formed in the section from a' to b' by the reference magnetic head 23, Tn2 the number of absolute tracks formed in the area from c' to d' by another magnetic head 23, and UA is an unused area of the area from d' to e'. This rate of relaxation varies depending on the area on the magnetic disks 21 (i.e., depending on the radial position), and also varies depending on another magnetic head 23.

The offset o1 of the reference magnetic head 23, the offset o2 of another magnetic head 23 (which varies from magnetic head to magnetic head), and the rate of relaxation γ that varies in response to the radial position on the magnetic disks 21 and also varies depending on which magnetic head is used as another magnetic head 23 are stored as parameters in the system area of the magnetic disks 21 or in the nonvolatile memory or the like. The MCU 31 uses these parameters via the HDC 34 to convert a physical track number into an absolute track number, thereby controlling the actuator 25 via the SVC 32 such as to move the magnetic heads 23 properly. The storing of the parameter in the system area of the magnetic disks 21 or in the nonvolatile memory or the like may preferably be performed before the shipment of the magnetic disk drive 1. If the parameters are stored in the system area, the retrieved parameters are loaded to the data buffer memory 35.

In the following, a second embodiment of the magnetic disk drive according to the present invention will be described. The configuration of main parts of the second embodiment of the magnetic disk drive is the same as that shown in FIG. 1, and an illustration and description thereof will be omitted. The present embodiment has a feature in the conversion from the virtual track number into the physical track number.

When writing is performed with respect to virtual tracks on both sides of any given virtual track on the magnetic disks 21, for example, these virtual tracks serve as a noise source with respect to this given virtual track, which causes an error rate to increase when data is read from this given virtual track. As the number of times writing is performed with respect to the virtual tracks on both sides increases, the deterioration of the error rate becomes increasingly conspicuous. In the worst case in which exceeding a data read threshold occurs, data cannot be properly read from this given virtual track.

Figure 4:
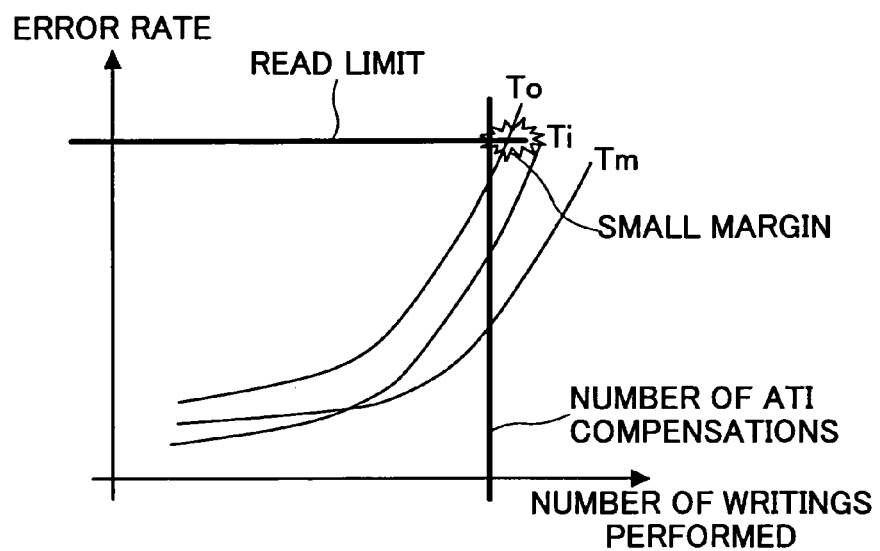
FIG. 4 is a drawing showing the relationship between an error rate and the number of times writing is performed with respect to adjacent virtual tracks.
Figure 5:
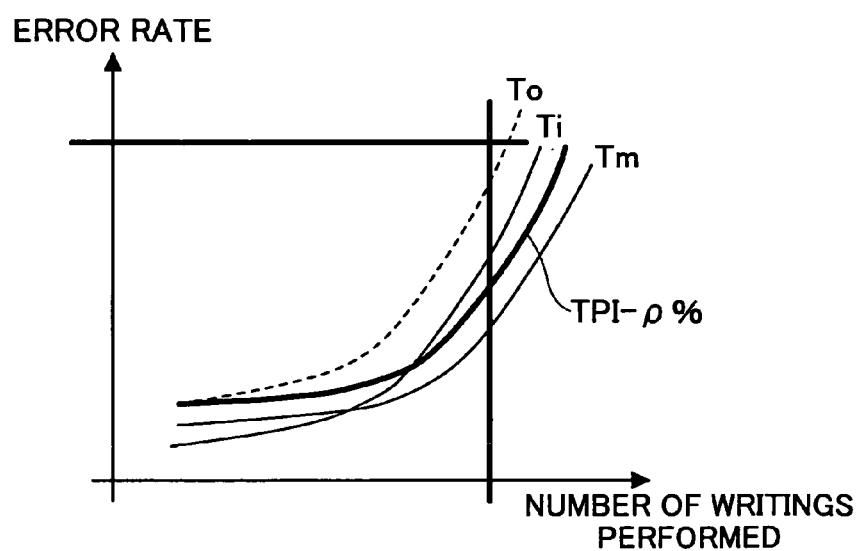
FIG. 5 is a drawing showing the relationship between an error rate and the number of times writing is performed with respect to adjacent virtual tracks when the TPI of virtual tracks in an outer area is reduced by σ%.

FIG. 4 is a drawing showing the relationship between such error rate and the number of times writing is performed with respect to adjacent virtual tracks. This relationship is illustrated with respect to a virtual track To in an outer area of the magnetic disks 21, a virtual track Ti in an inner area, and a virtual track Tm in a middle area. In FIG. 4, the vertical axis represents an error rate, and the horizontal axis represents the number of times writing is performed with respect to the adjacent virtual tracks, with each axis being represented in an arbitrary unit. The number of ATI compensations indicates the maximum number of times writing is performed with respect to the adjacent virtual tracks such that an ATI is kept within a tolerable range. As can be seen from FIG. 4, in the case of the virtual track To in the outer area, a margin with respect to the number of ATI compensations is very small. If the TPI of the virtual track To in the outer area is reduced by σ%, a sufficient margin can be obtained with respect to the number of ATI compensations as shown in FIG. 5. In FIG. 5, the same elements as those of FIG. 4 are referred to by the same symbols, and a description thereof will be omitted.

Figure 6:
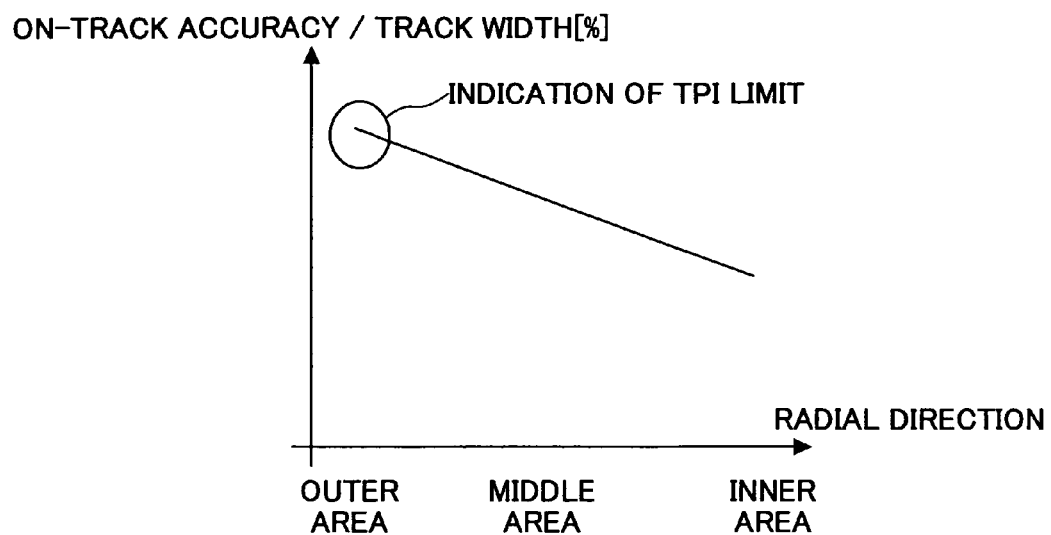
FIG. 6 is a drawing showing on-track accuracy with respect to a virtual track in an outer area of the magnetic disks, a virtual track in an inner area, and a virtual track in a middle area.
Figure 7:
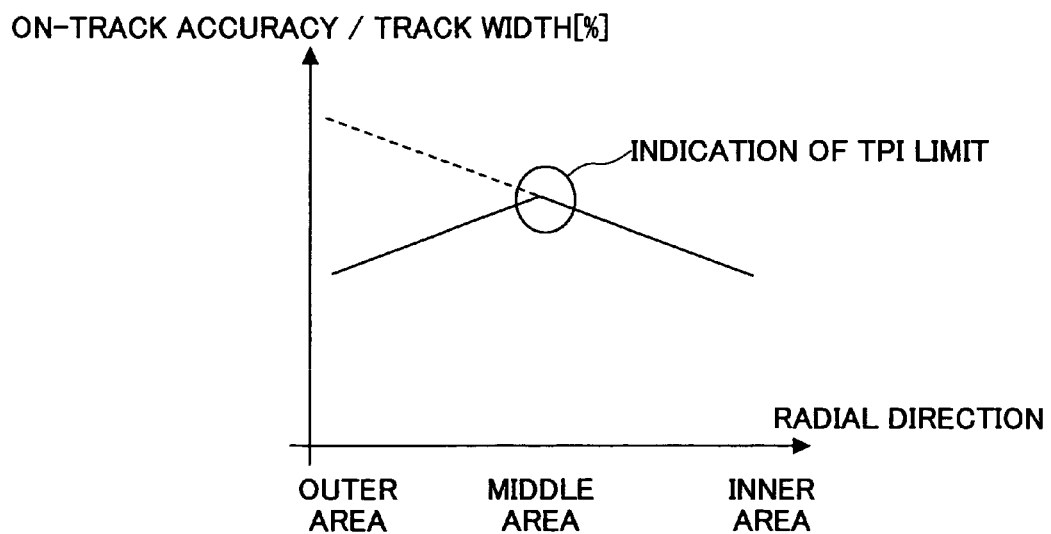
FIG. 7 is a drawing showing on-track accuracy when the TPI of virtual tracks in the outer area is reduced.

FIG. 6 is a drawing showing on-track accuracy with respect to a virtual track To in an outer area of the magnetic disks 21, a virtual track Ti in an inner area, and a virtual track Tm in a middle area. In FIG. 6, the vertical axis represents a percentage corresponding to [on-track accuracy]/[track width] with respect to a virtual track, and the horizontal axis represent the radial position on the magnetic disks 21 in an arbitrary unit. As can be seen from FIG. 6, the virtual track To in the outer area where on-track accuracy is the worst provides an indication of the limit of the TPI. This is because with on-track accuracy has a greater NRRO (non-repeatable run-out) in the outer area. If the TPI from the outer area to the middle area is reduced across the board as shown in FIG. 7, the TPI at the point in question is widened, so that the on-track accuracy in the middle area can be used as an indication of the limit of the TPI. In FIG. 7, the same elements as those of FIG. 6 are referred to by the same symbols, and a description thereof will be omitted.

Figure 8:
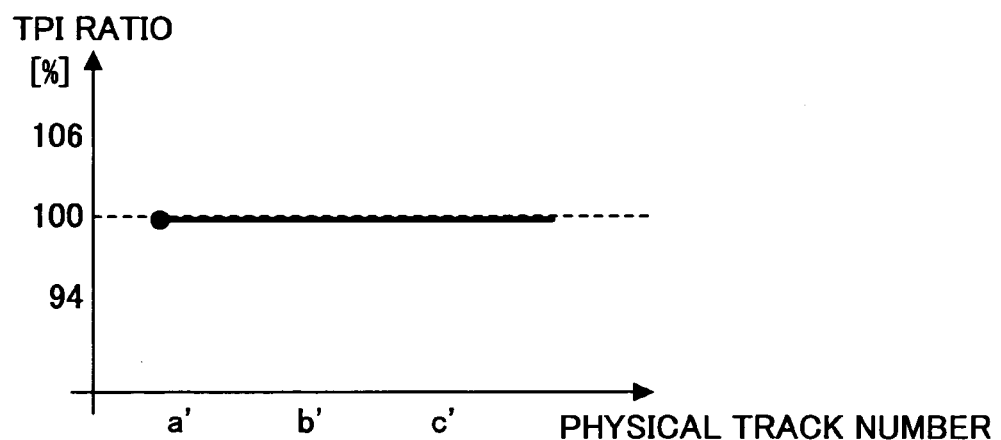
FIG. 8 is a drawing showing the relationships between a TPI ratio of virtual tracks and the physical track number with respect to a case in which the TPI of virtual tracks is constant.
Figure 9:
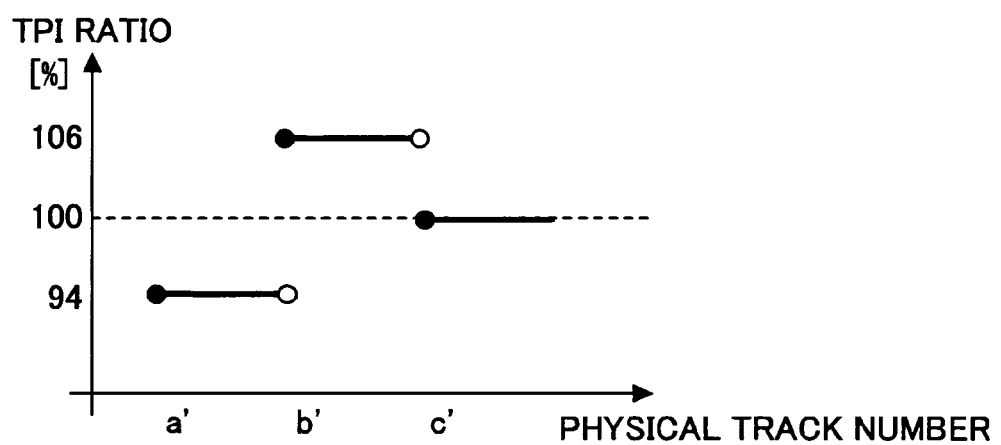
FIG. 9 is a drawing showing the relationships between a TPI ratio of virtual tracks and the physical track number with respect to a case in which the TPI is relaxed in an outer area, narrowed in a middle area, and kept unchanged in an inner area.

FIG. 8 is a drawing showing the relationships between a TPI ratio of virtual tracks and the physical track number with respect to a case in which the TPI of virtual tracks is constant. FIG. 9 is a drawing showing the relationships between a TPI ratio of virtual tracks and the physical track number with respect to a case in which the TPI is relaxed in an outer area, narrowed in a middle area, and kept unchanged in an inner area. In FIG. 8 and FIG. 9, the vertical axis represents a ratio α (%) of the TPI of virtual tracks being used to the TPI of physical tracks, and the horizontal axis represents the physical track number in an arbitrary unit.

Figure 10:
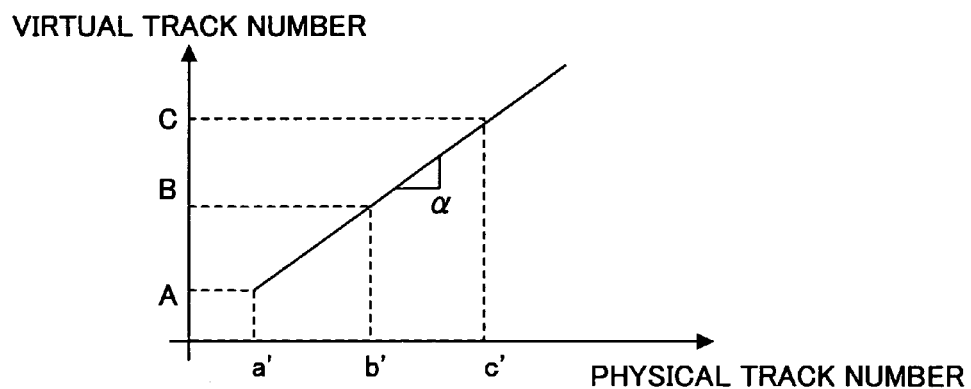
FIG. 10 is a drawing showing the relationship between the virtual track number and the physical track number with respect to a case in which the TPI of virtual tracks is constant.
Figure 11:
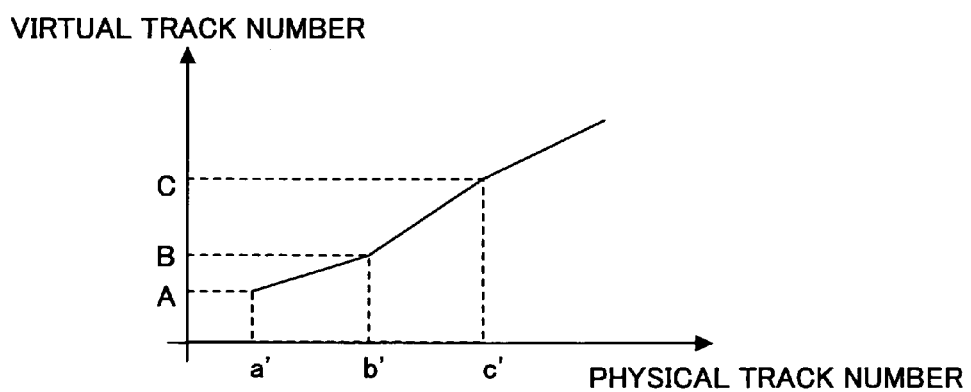
FIG. 11 is a drawing showing the relationship between the virtual track number and the physical track number with respect to a case in which the TPI is relaxed in an outer area, narrowed in a middle area, and kept unchanged in an inner area.

FIG. 10 is a drawing showing the relationship between the virtual track number and the physical track number with respect to a case in which the TPI of virtual tracks is constant. FIG. 11 is a drawing showing the relationship between the virtual track number and the physical track number with respect to a case in which the TPI is relaxed in an outer area, narrowed in a middle area, and kept unchanged in an inner area. In FIG. 10 and FIG. 11, the vertical axis represents the virtual track number, and the horizontal axis represents the physical track number, with each axis being illustrated in an arbitrary unit.

When the relationship between the virtual track number and the physical track number is selected such that the TPI is relaxed in an outer area, narrowed in a middle area, and kept unchanged in an inner area, an ATI can be suppressed while improving the record density of the magnetic disks 21. In this embodiment, the TPI of virtual tracks is set to values that differ from area to area such as from zone to zone on the magnetic disks 21.

When the TPI of virtual tracks is constant as shown in FIG. 8 or in FIG. 10, the physical track number x' is obtained as x'=α(X−A)+a' where X is the virtual track number to be sought, A the track number of the starting virtual track, a' the track number of the starting physical track, and α (%) a ratio of the TPI of virtual tracks to the TPI of physical tracks.

When the TPI of virtual tracks varies as shown in FIG. 9 or in FIG. 11, on the other hand, the physical track number x' is obtained as follows.

In the case of X<B, x'=α1(X−A)+a' where α1 represents the relaxation of the ratio with respect to the TPI ratio α, which serves as a reference in an area ranging from the starting virtual track number A to a virtual track number B (α1=α×94%).

In the case of X<C, x'=α2(X−B)+b' where α2 represents the relaxation of the ratio with respect to the TPI ratio α, which serves as a reference in an area ranging from the virtual track number B to a virtual track number C (α2=α× 106%), and b' represents the physical track number corresponding to B.

In the case of X≧C, x'=α3(X−C)+c' where α3 represents the relaxation of the ratio with respect to the TPI ratio α, which serves as a reference in an area from the virtual track number C onward (α3=α×100%), and c' represents the physical track number corresponding to C.

The TPI ratios α, α1 through α3, the virtual track numbers A through C, the physical track numbers a' through c', the above-noted relational formula (function), and so on are stored as parameters in the system area of the magnetic disks 21 or in the nonvolatile memory or the like. The MCU 31 uses these parameters via the HDC 34 to convert a virtual track number into a physical track number, thereby controlling the actuator 25 via the SVC 32 such as to move the magnetic heads 23 properly. The storing of the parameter in the system area of the magnetic disks 21 or in the nonvolatile memory or the like may preferably be performed before the shipment of the magnetic disk drive 1. If the parameters are stored in the system area, the retrieved parameters are loaded to the data buffer memory 35.

In the present embodiment, control such as the one described in connection with the first embodiment may be performed concurrently. This can further suppress an ATI.

In the following, a third embodiment of the magnetic disk drive according to the present invention will be described. The configuration of main parts of the third embodiment of the magnetic disk drive is the same as that shown in FIG. 1, and an illustration and description thereof will be omitted. The present embodiment has a feature in the conversion from the virtual track number into the physical track number.

Figure 12:
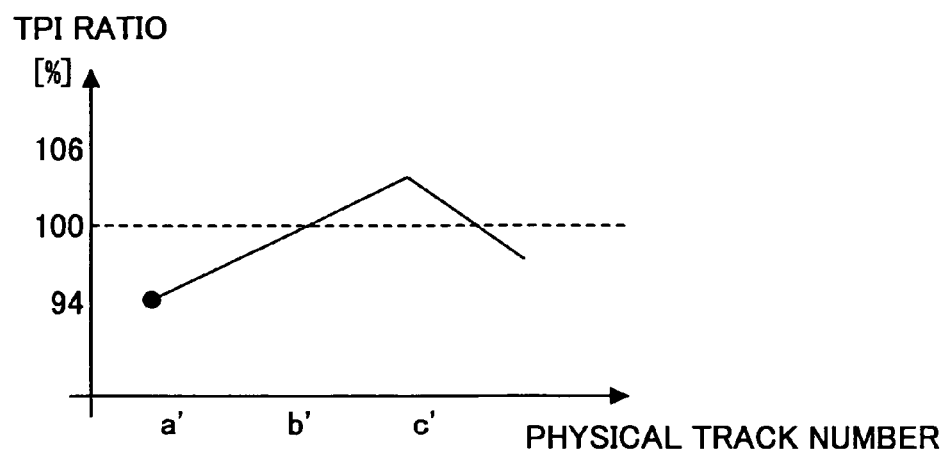
FIG. 12 is a drawing showing the relationship between a virtual track TPI ratio and the physical track number with respect to a case in which the TPI of virtual tracks is changed continuously in an outer area, middle area, and inner area.
Figure 13:
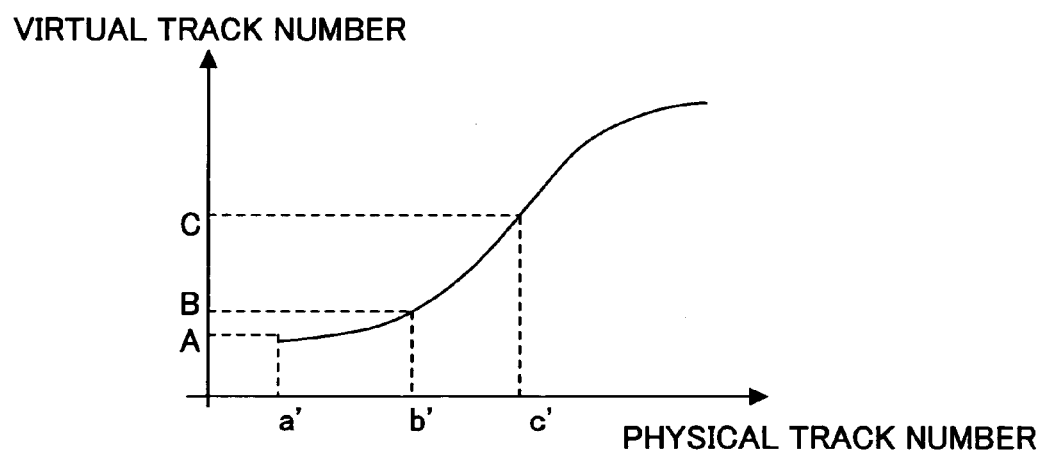
FIG. 13 is a drawing showing the relationship between the virtual track number and the physical track number with respect to a case in which the TPI of virtual tracks is changed continuously in an outer area, middle area, and inner area.

In the present embodiment, the TPI of virtual tracks changes as shown in FIG. 12 and in FIG. 13. FIG. 12 is a drawing showing the relationship between a virtual track TPI ratio and the physical track number with respect to a case in which the TPI of virtual tracks is changed continuously in an outer area, middle area, and inner area. In FIG. 12, the same elements as those of FIG. 9 are referred to by the same symbols, and a description thereof will be omitted.

FIG. 13 is a drawing showing the relationship between the virtual track number and the physical track number with respect to a case in which the TPI of virtual tracks is changed continuously in an outer area, middle area, and inner area. In FIG. 13, the same elements as those of FIG. 11 are referred to by the same symbols, and a description thereof will be omitted.

Namely, in this embodiment, the TPI of virtual tracks is changed continuously for each area such as each zone on the magnetic disks 21, and is also continuously changed at the boundaries between adjacent areas. Accordingly, the TPI of virtual tracks changes smoothly anywhere on the magnetic disks 21.

In the present embodiment, control such as the one described in connection with the first embodiment may be performed concurrently. This can further suppress an ATI.

Figure 14:
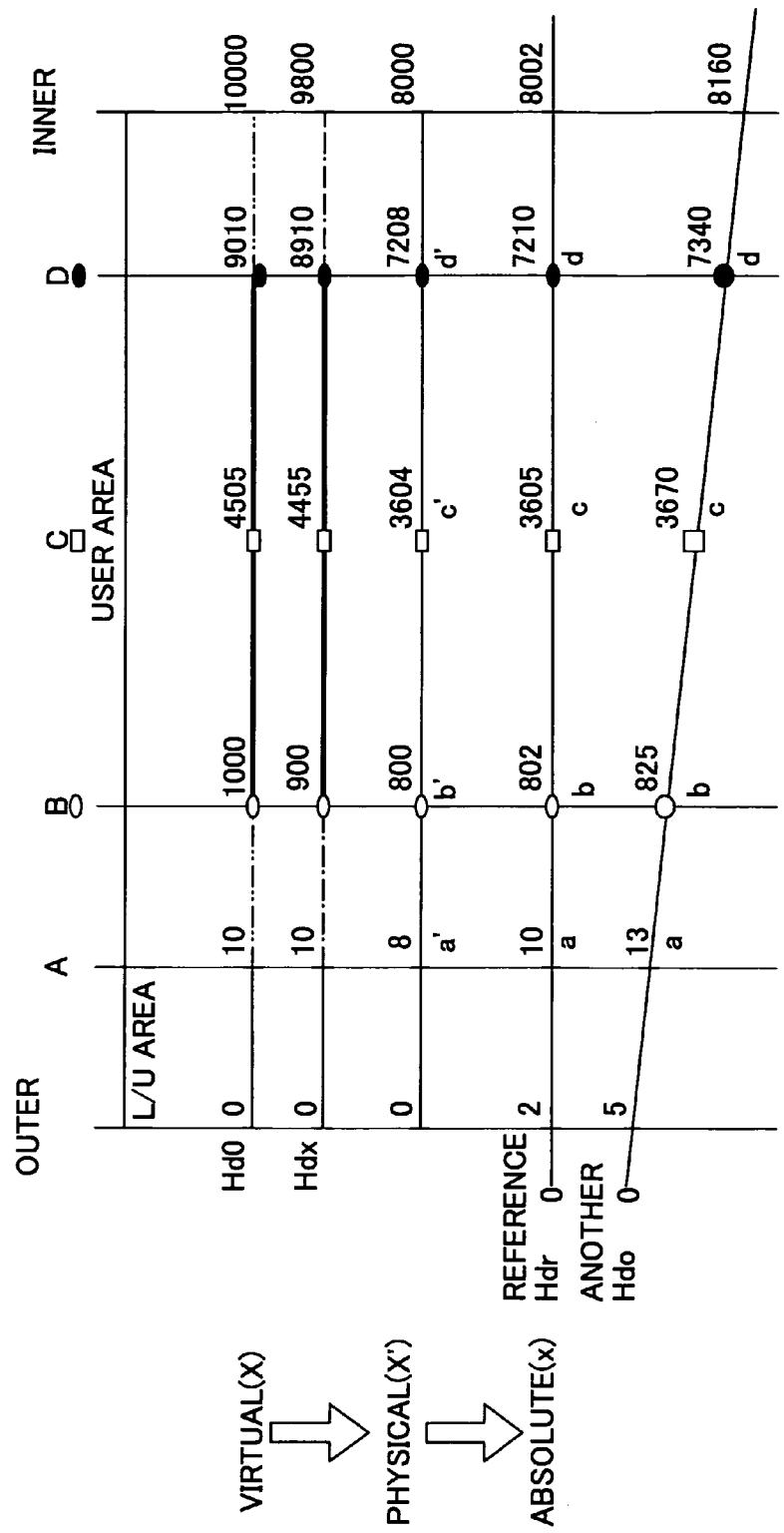
FIG. 14 is a drawing showing the relationship between the virtual track number, the physical track number, and the absolute track number.

FIG. 14 is a drawing showing the relationship between the virtual track number X, the physical track number x', and the absolute track number x. In FIG. 14, the top portion represents the virtual track areas on the magnetic disks 21. An L/UL (load/unload) area is a dummy area serving to prevent data destruction at the time of loading or unloading of the magnetic heads 23 to or from the magnetic disks 21. A, B, C, and D indicates virtual track numbers (or virtual track boundaries) in the user area. Hd0 and Hdx represent respective magnetic heads 23. It can be seen that the virtual track number X differs from magnetic head to magnetic head. In FIG. 14, thick solid lines indicate areas where the TPI has a narrow setting, chain lines with one dot indicating areas where the TPI has a wide setting, and chain lines with two dots indicating areas where the TPI has a middle setting.

As shown in FIG. 14, the physical track number x' indicates the same head position (i.e., the same read position) regardless of which magnetic head 23 is used. The absolute track number x has an offset as previously described, and absolute track areas include an unused area UA as previously described. In FIG. 14, the reference magnetic head 23 is shown as Hdr, and another magnetic head 23 is shown as Hdo. One of the magnetic heads 23 that has the smallest unused area UA (i.e., the relaxation rate γ is closest to 1) according to actual measurements of unused areas UA caused by the inter-media collapse between the magnetic heads 23 may preferably be used as the reference magnetic head Hdr. With this arrangement, another magnetic head Hdo always has an unused area UA that increases in a positive direction as viewed from the reference magnetic head Hdo (i.e., in the direction in which the physical track number increases).

Rather than converting the virtual track number X directly into the absolute track number x, the virtual track number X is first converted into the physical track number x', which is then converted into the absolute track number x. This is because there is a need to access the common physical track number in order to access the system area of the magnetic disks 21 to refer to the parameters shared by the magnetic heads 23.

The physical track number x' in this case may be obtained as follows.

$$\alpha(X)=[\{(X-A)(106-94)/(C-A)+94\}/100]\alpha=(X-A)\alpha n+\beta n$$

$$x'=(\alpha n/2)(X-A)^2+\beta n(X-A)+a'$$

The TPI ratio α, the TPI information αn and βn (αn: the slope of α, βn: the intercept of α), the virtual track numbers A through C, the physical track numbers a' through c', the above-noted relational formula (function), and so on are stored as parameters in the system area of the magnetic disks 21 or in the nonvolatile memory or the like. The MCU 31 uses these parameters via the HDC 34 to convert a virtual track number into a physical track number, thereby controlling the actuator 25 via the SVC 32 such as to move the magnetic heads 23 properly. The storing of the parameter in the system area of the magnetic disks 21 or in the nonvolatile memory or the like may preferably be performed before the shipment of the magnetic disk drive 1. If the parameters are stored in the system area, the retrieved parameters are loaded to the data buffer memory 35.

FIG. 15 is a drawing for explaining parameters stored in the system area of the magnetic disks 21 or the nonvolatile memory or the like when control such as the one described in connection with the first embodiment is concurrently used. For the sake of convenience of explanation, a parameter table is stored in the system area in this example. As shown in FIG. 15, the parameter table stored in the system area includes parameters provided separately for each of the magnetic heads 23 and parameters provided in common with respect to all the magnetic heads 23. With respect to a given magnetic head Hd0, a virtual area boundary, TPI information, a relaxation rate, an absolute area boundary, and so on are stored separately for each zone number on the magnetic disk 21. Although the illustration is omitted, the same kinds of parameters are also stored with respect to each of the magnetic heads 23. A physical area boundary is stored separately for each zone number on the magnetic disks 21 with respect to all the magnetic heads 23 as common data.

The contents of the parameter table may be adjusted and finalized according to measurements before storage in the system area. In order to do so, the physical area boundaries a', b', c', and so on that are changed in response to the position of the magnetic heads 23 on the magnetic disks 21 need to be determined. The TPI information $\alpha n$ and $\beta n$ may be determined by obtaining the slope $\alpha n$ and intercept $\beta n$ of the straight line for which the TPI is modified according to a margin with respect to the number of ATI compensations between particular virtual tracks with respect to each of the magnetic heads 23. The virtual area boundary A is the starting virtual track number, and is a fixed value. The virtual area boundary B and subsequent boundaries may be determined based on the following formulas.

$$b' = (\alpha 1/2)(B-A)^2 + \beta 1(B-A) + a'$$

$$c' = (\alpha 2/2)(C-B)^2 + \beta 2(C-B) + a'$$

The absolute area boundaries a, b, c, and so on may be derived from the absolute track numbers read at the physical area boundaries a', b', c', and so on by use of the reference magnetic head Hdr, which is one of the magnetic heads 23 that has the smallest unused area UA (i.e., has the relaxation rate $\gamma$ closest to 1). The relaxation rate $\gamma 1$, $\gamma 2$, and so on may be derived from changes in the absolute area boundaries a, b, c, and so on. For example, $\gamma 1$ is obtained as $(b-a)/(b'-a')$.

FIG. 16 is a flowchart showing a seek operation of the magnetic disk drive 1 having a parameter table stored therein. The process of FIG. 16 is performed by the MCU 31 shown in FIG. 1.

In FIG. 16, at step S1, the system area of the magnetic disks 21 is read upon the power-on of the magnetic disk drive 1. At step S2, control information inclusive of the parameter table as described above is laid out in the data buffer memory 35. At step S3, a read or write command indicative of a seek address by use of a logical block address (LBA) is received from the host apparatus 41. At step S4, a magnetic head 23 to perform a seek operation and a virtual track number are obtained from the LBA according to a conventional method. In this example, for the sake of convenience of explanation, the selected magnetic head 23 is the magnetic head Hd0 shown in FIG. 15, and is to perform a seek operation toward a virtual track number X. At step S5, the virtual area boundary C corresponding to zone number "0" with respect to the magnetic head Hd0 is read from the data buffer memory 35. At step S6, a check is made as to whether the virtual area boundary C is greater than the virtual track number X. If the result of the check is "NO" at step S6, a check is made at step S7 as to whether the retrieved zone number (zone number "0" in this case) is the maximum. If the result of the check is "NO" at step S7, the zone number is incremented by 1 at step S8, the procedure then returns to step S6.

If the result of the check at step S6 or at step S7 is "YES", the virtual track number X is converted at step S9 into a physical track number x' according to $x' = (\alpha 1/2)(X-A)^2 + \beta 1(X-A) + a'$, for example. At step S10, the physical track number x' is converted into an absolute track number x according to $x = \gamma 1(x'-a') + a$. At step S11, the actuator 25 is controlled via the SVC 32 so as to move the magnetic heads 23 properly in response to the obtained absolute track number x.

In this embodiment, an ATI can be further suppressed even without using control as the one used in the first embodiment. In this case, the TPI of virtual tracks changes smoothly all over the magnetic disks 21 in contrast with the second embodiment. Because of this, a difference in the margin with respect to the number of ATI compensations at each area boundary (zone boundary) can be made smaller Further, the present invention is not limited to these embodiments, but various variations and modifications may be made without departing from the scope of the present invention.

The present application is based on Japanese priority application No. 2005-277837 filed on Sep. 26, 2005, with the Japanese Patent Office, the entire contents of which are hereby incorporated by reference.

What is claimed is:

1. A magnetic disk apparatus for reading read data from and writing write data to magnetic disks on a virtual-track-number-specific basis, absolute track numbers being track numbers of tracks formed on the magnetic disks by an SSTW, physical track numbers being track numbers into which the absolute track numbers are converted such that when a reference magnetic head is fixedly placed at any given position on the magnetic disks, identical track numbers are read from the reference magnetic head and from another magnetic head, and virtual track numbers being track numbers into which the physical track numbers are converted such that a track pitch becomes suitable for each magnetic head and also for each area on the magnetic disks, said magnetic disk apparatus comprising:

a first conversion unit configured to convert a physical track number into an absolute track number by making a track pitch in an absolute track area formed by said another magnetic head wider by a given amount than a track pitch in a corresponding absolute track area formed by said reference magnetic head if a number of absolute tracks is larger in the absolute track area of absolute tracks formed by said another magnetic head than in the absolute track area of absolute tracks formed by said reference magnetic head although a number of physical tracks is identical in corresponding physical track areas between different magnetic disks, said given amount being commensurate with an unused area corresponding to a difference in the number of absolute tracks between the absolute track area of absolute tracks formed by said another magnetic head and the corresponding absolute track area of absolute tracks formed by said reference magnetic head.

2. The magnetic disk apparatus as claimed in claim 1, wherein said first conversion unit is configured to convert a physical track number x' into an absolute track number x with respect to said reference magnetic head according to x=x'+o1 where o1 indicates an offset, and is configured to convert a physical track number x' into an absolute track number x with respect to said another magnetic head according to x=γx'+o2 where o2 indicates an offset, and γ is a relaxation rate of the track pitch, γ being (Tn2+UA)/Tn1 where Tn1 is a number of absolute tracks formed by said reference magnetic head in a given physical track area section, Tn2 being a number of absolute tracks formed by said another magnetic head in a corresponding physical track area section, and UA being an unused area of said corresponding physical track area section, and wherein said relaxation rate γ varies depending on a radial position on the magnetic disks, and also varies depending on which one is said another magnetic head.

3. The magnetic disk apparatus as claimed in claim 2, wherein said relaxation rate γ is set to a value that varies from zone to zone on the magnetic disks.

4. The magnetic disk apparatus as claimed in claim 1, further comprising a second conversion unit configured to convert a virtual track number into a physical track number.

5. The magnetic disk apparatus as claimed in claim 4, wherein said second conversion unit is configured to set a track pitch of virtual tracks to a value that varies from area to area on the magnetic disks.

6. The magnetic disk apparatus as claimed in claim 2, wherein said second conversion unit is configured to change a track pitch of virtual tracks smoothly for each area on the magnetic disks.

7. The magnetic disk apparatus as claimed in claim 6, wherein said second conversion unit is configured to change the track pitch of virtual tracks smoothly at a boundary between adjacent areas.

8. The magnetic disk apparatus as claimed in claim 5, wherein said area on the magnetic disks is a zone.

9. A magnetic disk apparatus for reading read data from and writing write data to magnetic disks on a virtual-track-number-specific basis, absolute track numbers being track numbers of tracks formed on the magnetic disks by an SSTW, physical track numbers being track numbers into which the absolute track numbers are converted such that when a reference magnetic head is fixedly placed at any given position on the magnetic disks, identical track numbers are read from the reference magnetic head and from another magnetic head, and virtual track numbers being track numbers into which the physical track numbers are converted such that a track pitch becomes suitable for each magnetic head and also for each area on the magnetic disks, said magnetic disk apparatus comprising:

a first conversion unit configured to convert a virtual track number into a physical track number, wherein said first conversion unit is configured to change a track pitch of virtual tracks continuously for each area on the magnetic disks.

10. The magnetic disk apparatus as claimed in claim 9, wherein said first conversion unit is configured to change the track pitch of virtual tracks smoothly at a boundary between adjacent areas.

11. The magnetic disk apparatus as claimed in claim 9, wherein said area on the magnetic disks is a zone.

12. The magnetic disk apparatus as claimed in claim 9, further comprising a second conversion unit configured to convert a physical track number into an absolute track number.

* * * * *